United States Patent Office 3,219,636
Patented Nov. 23, 1965

3,219,636
PROCESS FOR PREPARING INTERPOLYMERS OF VINYL CHLORIDE, VINYL ACETATE AND AN ETHENOID ACID
Samuel Loshaek, Stamford, Conn., and Sorrel Povlow, Philadelphia, and Benjamin D. Halpern, Jenkintown, Pa., assignors to The Borden Company, New York, N.Y., a corporation of New Jersey
No Drawing. Filed May 4, 1961, Ser. No. 107,663
5 Claims. (Cl. 260—78.5)

This invention relates to interpolymerizing vinyl chloride, vinyl acetate, and a water soluble ethenoid acid such as maleic or fumaric acid.

For polymerizations of this type, solution polymerization has been used heretofore with the attendant disadvantages of handling and recovering the organic solvent and the requirement of the precipitating step, to separate the resulting polymer from the solution in the solvent when it is desired to use the product in solid condition.

Attempts to effect the polymerization by the less costly suspension technique suitable for many copolymerizations have given, when one of the monomers is a water soluble acid, brownish discolored coarse beads of size above the fineness desired, imperfect solubility in acetone or like solvent and content of the water soluble acid monomer below that necessary for satisfactory adherence of the product, when coated onto surfaces of solids, without baking the polymer coating.

The present invention provides a process for the polymerization to the terpolymer so as to give beads that are of desirable small size, are white in color in spite of the low pH at which formed, dissolve in solvents such as acetone, methyl ethyl ketone and ethyl acetate, alone or in combination with aromatic hydrocarbons, to substantially clear, water white solutions, and contain such increased amounts of the water soluble ethenoid acid as to adhere to surfaces of solid articles with little baking and in many uses with no baking at all.

Briefly stated, our invention comprises the process and product of interpolymerization of vinyl chloride with vinyl acetate and the ethenoid acid in contact with a color stabilizer, of which stabilizer the combination of an alkali metal persulfate and methanol constitute a particularly effective example. The methanol when used also practically doubles the amount of the water soluble acid that leaves the aqueous suspending medium and appears in the finished interpolymer, over the amount when methanol is omitted and other conditions are comparable.

The potassium persulfate or like water soluble percompound in the polymerization mixture protects the originally white product from objectionable discoloration although the percompound is used in very low proportion to the weight of polymer produced. The persulfate, even in larger amount, is without practical effect in bleaching the interpolymer made without the introduction of the persulfate or the like before polymerization is effected.

As to materials, the vinyl chloride and vinyl acetate used are the usual commercial or more nearly pure forms of the monomers.

The ethenoid acid to be used is ordinarily supplied as maleic acid (or anhydride), fumaric acid or a mixture of the two, as in the proportion of at least 10% of either on the total weight of the two used.

The solvent to be mixed with the water in forming the liquid medium for the suspension is a water soluble alcohol and ordinarily methanol, although we may use another $C_1$-$C_3$ monohydric alcohol, i.e., ethanol, propanol, or isopropanol. Tertiary butyl alcohol also is satisfactory.

As the suspending agent in the liquid medium, we use a water dispersible hydrophylic and lipophylic compound, e.g., the copolymer of polyvinyl methyl ether and maleic anhydride (PVM/MA) such as grades of specific viscosities 0.1—0.5 and 2.5—3.5, all measured in a 1% solution in methyl ethyl ketone at 20° C. Other suspending agents that we can use are polyvinyl alcohol of any commercial grade such as one representing polyvinyl acetate hydrolyzed to the extent of 88%–98%, polyacrylic and polymethacrylic acids, polymers of methyl and ethyl esters of acrylic and methacrylic acids and copolymers of such esters in monomeric form with acrylic and methacrylic acid.

As the chain transfer agent, we use trichloroethylene or any other one of the chain transfer agents that are conventionally used in suspension polymerization of ethenoid compounds as, for example, xylene, carbon tetrachloride, toluene, chloroform, and epichlorohydrin.

As the initiator of the ethenoid bond polymerization, we introduce the usual free radical, oil-soluble initiators of such polymerization such as aliphatic and aromatic peroxides, percarbonates and like organic peroxy compounds, examples of which are lauroyl, benzoyl and isopropyl peroxides, disopropyl, diethyl and dioctyl percarbonates; and azobisisobutyrolnitrile.

As the peroxy component of the color stabilizer to avoid discoloration of our interpolymer, we find potassium and sodium persulfate particularly satisfactory. Other stabilizers that we can use with effect but with less satisfactory preservation of the color are ammonium persulfate; sodium, potassium and ammonium perborates; hydrogen peroxide, and like water soluble inorganic peroxy compounds. Although these stabilizers are under other circumstances initiators of ethenoid bond polymerization, they serve the different purpose in our aqueous acid medium with our materials in the proportions used. Tests show that the water soluble peroxy compounds have no substantial effect, in our interpolymerization, upon the extent on such polymerization. When they are omitted, however, there, is a pronounced discoloration of the resulting interpolymer, as during the final drying step, at temperatures as low as 120° F. for 18 hours in a representative run.

As to proportions, the following table shows ranges that are permissible and also those that are recommended for best results in commercial operations. In this table and elsewhere herein proportions are expressed as parts by weight unless specifically stated to the contrary.

| Material | Parts by Weight for 100 parts Total Monomers Used | |
|---|---|---|
| | Permissible | Recommended |
| Vinyl acetate | 3–30 | 5–30 |
| Ethenoid acid | 0.5–5 | 0.8–1.5 |
| Vinyl chloride | To make total monomers 100 | |
| Initiator of polymerization | 0.1–1 | 0.2–0.6 |
| Suspending agent | 0.03–1 | 0.05–0.2 |
| Color stabilizer | 0.05–2 | 0.08–1 |
| Chain transfer agent | 0–3 | 0.5–2 |
| Aqueous suspending liquid | 50–1,500 | 100–1,000 |
| $C_1$-$C_4$ alcohol, percent in said liquid | 5%–30% | 10%–25% |

The proportion of the vinyl chloride is approximately 70–97 parts by weight for 100 total weight of said monomers.

The proportion of vinyl acetate is increased within the ranges stated when it is desired to increase the solubility of the finished interpolymer in the organic solvents stated.

The ethenoid acid is used in amounts in the upper part of the ranges stated for maximum effect on adherence of the film of the interpolymer to the surfaces of solids.

When the amounts of the other materials used are much less than the minima shown, they are not properly effective. When the amounts are above the maxima shown, the extra amount is unnecessary and uneconomical.

The proportion of total liquid medium, including the water and water soluble alcohol, is made such that the proportion of total monomers in the interpolymerizing mixture is about 10%–50% on the weight of the finished solution. This means about 10%–50% of solids at the end of the interpolymerization.

The proportion of the methanol or other alcohol is critical, as shown by the effect on the percentage of the ethenoid acid in the final terpolymer. When the acid component in the suspension was 5 parts of maleic acid for 100 of total monomers, we obtained terpolymers of maleic acid content tabulated below, for various proportions of methanol used to water.

TABLE

| Methanol, percent of the water in the liquid medium: | Percentage of maleic acid in finished interpolymer |
|---|---|
| 0 | 0.5 |
| 10 | 0.8 |
| 15 | 1.1 |
| 20 | 1.3 |

As to conditions of operation, the various materials are suspended, as by continuous and thorough agitation, in the proportions shown in an air-evacuated reactor.

The water used in the aqueous suspending liquid medium is deionized in advance by any usual method. The deionization removes the metal ions which, if present, sometimes cause undesired complications in the polymerizations of this general type.

We warm the suspension to a moderately elevated temperature, so as to accelerate the interpolymerization, but below the temperature of uncontrollable or violent reaction. Thus we effect the polymerization ordinarily at about 140°–145° F. when lauroyl peroxide is the initiator. With less active initiators, we raise the temperature by 10°–20° F. or so. With a more active initiator, such as isopropyl percarbonate we lower the temperature, to 90° F. With the various initiators we polymerize at temperatures within the range room temperature up to a point just below the softening temperature of the finished interpolymer, as between 70° and 160° F. The temperature will be lower in this range, under a given set of conditions, the longer the time allowed for the polymerization to occur.

We introduce the vinyl chloride, particularly that introduced after the batch is at the polymerization temperature, gradually, that is, as a slow stream or in small increments over a considerable period such as several hours, so as to avoid violent reaction or overheating.

We find desirable the control of the ratio of the vinyl chloride to the vinyl acetate throughout the polymerization. For this control we maintain a substantially constant vapor pressure on the system, by introducing the vinyl chloride monomer in small increments or as a slow stream and continuing the introduction as the vapor pressure falls, always with exclusion of air.

After the reaction is completed the batch is cooled, to increase the hardness of the beads and facilitate draining away excess liquid from them. The liquid phase is then drawn off. The remaining beads are acid because of the maleic acid content, their pH in representative runs being within the range 1–2 and usually about 1.4–1.7.

The beads after the cooling are washed successively with an aqueous alkaline solution such as 3% sodium hydroxide solution in amount to neutralize most at least of the remaining acid and then with water until the pH of the beads, as shown by testing the washings, is raised by removal of uncombined maleic acid to about 5–7 and ordinarily about 6.5–7. Then the wet beads are centrifuged and then further dried at a temperature below the melting point of the beads and suitably at about 110°– 140° F. in a current of air. The product is a fine white powder which dissolves in acetone, methyl ethyl ketone, ethyl acetate and the like solvents to give a water white, i.e., colorless, clear solution. When such a solution is coated upon solid surfaces of steel, brass, glass, paper, or textile fabrics, for example, the coatings become strongly adherent without the need of baking.

The invention will be further illustrated by description in connection with the following specific examples of the practice of it.

*Example 1*

Into a glass lined jacketed reactor equipped with an agitator, there were introduced 17,500 parts of deionized water, a solution of 500 parts of maleic anhydride in 2,000 parts of additional deionized water, 8 parts of suspending agent in the form of the copolymer of polyvinyl methyl ether and maleic anhydride (PVM/MA) of specific viscosity 0.5–0.8, and 10 parts of potassium persulfate as color stabilizer.

The reactor vessel was then closed, the air evacuated therefrom, the agitator turned on at a speed to give vigorous agitation (400 r.p.m.) and the agitation continued throughout the subsequent polymerization. While excluding air, there were then introduced into the reactor 4,000 parts of methanol, 1,600 parts of vinyl acetate, 80 parts of trichloroethylene as chain transfer agent, 40 parts of lauroyl peroxide as initiator, and then 3,750 parts of vinyl chloride. The temperature of the mixture was raised to 145° F. At this time the vapor pressure in the free space above the suspension in the reactor was 90–93 p.s.i. gauge. Then there was introduced, at intervals and in 18 equal increments, additional vinyl chloride in the amount of 2,850 parts, the additions being made at the rate required to maintain the vapor pressure within the range stated, as in 5 hours. Then the temperature of the batch was lowered to 140° F. and 1800 parts of additional vinyl chloride were introduced in 12 equal increments at a rate to maintain the vapor pressure between 75–80 p.s.i., the total time required for this addition being approximately 2.5 hours.

The batch was then allowed to react at 140° F. for 3.5 hours more, during which time the vapor pressure in the reactor fell to 30 p.s.i. The batch was then cooled to 90° F. and the unreacted vinyl chloride vented off. The polymer slurry remaining in the reactor had a pH of 1.4.

The slurry of the polymer was discharged from the reactor and washed with 3 successive portions of deionized water. This caused the pH to rise to 6.5–7.0 as determined on the washings.

The washed terpolymer was centrifuged and then dried additionally for 18 hours at 120° F. The use of PVM/MA, as the suspending agent, makes possible the obtaining of a terpolymer that, after decant-washing, is clear. It is noted that the oil soluble initiators are soluble in the monomers used.

The product was a fine white powder which exhibited excellent clarity in solution in the lower ketones. These ketone solutions when coated on glass or metal produced clear, white transparent films which adhered with no baking required. Properties of the terpolymer are shown below.

Color, white; clarity of 25% solution in acetone and in methyl ethyl ketone, excellent; Brookfield viscosity of 30% solution in methyl ethyl ketone at 73° F., 430 cps.; chemical analysis—vinyl chloride 85.3%, maleic acid 1.1% and vinyl acetate (by difference), 13.5%; adhesion—good; and screen test:

| Mesh | Percent on |
|---|---|
| 20 | 0.2 |
| 40 | 0.2 |
| 60 | 1.0 |
| 80 | 18.9 |
| 100 | 42.5 |
| 200 | 33.6 |
| Pan | 3.6 |

In a preparation which was made in comparable manner except that the methanol was omitted, the resulting terpolymer beads were coarse and contained only 0.5% of maleic acid. Furthermore the terpolymer had a light brown color.

In another modification of this example, the composition and process were as first described including the added methanol but the potassium persulfate was omitted. The terpolymer contained 1.1% of maleic acid but was dark brown in color.

*Example 2*

The procedure and composition of Example 1 are used except that the maleic acid there used is replaced by an equimolar weight of fumaric acid.

*Example 3*

The procedure and composition of Example 1 are used except that the potassium persulfate there used is replaced, in turn, by an equal weight of each of the other water soluble inorganic persalt color stabilizers disclosed above as alternatives for the potassium persulfate.

*Example 4*

The procedure and composition of Example 1 are used except that the chain transfer agent, the initiator, and the suspending agent there used are replaced by an equal weight of any of the other chain transfer agents, initiators and suspending agents, respectively, that are shown herein.

In a modification of this example, the chain transfer agent is omitted. The resulting polymer is of higher viscosity.

The products made as described in the examples above are not only water white and clear in their solutions in acetone, methyl ethyl ketone and ethyl acetate but also adherent to surfaces of glass, metal, paper, fabric or the like either without baking or with warming only at moderately elevated temperatures such as 120° F., to drive off the solvent. At 120° F. this occurs in less than 30 minutes. Air drying would take several hours.

The products made as described are useful, particularly those of Examples 1–4, as protective or decorative coatings on various solid surfaces. Thus iron surfaces may be protected by applying thereover, as by brushing or spraying, a solution of the interpolymer in methyl ethyl ketone and allowing the solvent to evaporate. When the interpolymer is to be used as the medium for decorating the surface, then a solution of it, as in methyl ethyl ketone, is mixed intimately with a pigment of the color desired, examples being chromic oxide, titanium dioxide, cadmium sulfide, one of the iron oxide pigments such as an umber, or mixtures thereof.

Also the interpolymers are useful in making strippable coating compositions, as for surfaces of articles to be protected when not in use and then stripped from the articles. For such purposes, we blend our strongly adherent interpolymer with a substantial proportion of another material that promotes parting of coatings from surfaces. Thus we may use as little as 10 parts by weight of our terpolymer with 90 parts of a copolymer of vinyl chloride and vinyl acetate containing approximately 85 parts of vinyl chloride and 15 parts of vinyl acetate by weight. This polymer is then sprayed upon or applied in solution in methyl ethyl ketone, acetone, or the like to the surface of machined metal parts, for instance, that are to be protected before actual use.

Our terpolymers are useful in making reactive coatings utilizing the reactivity of the free carboxylic acid groups in our product. Basic pigments, such as blue basic lead sulfate compounded with the terpolymer yield coatings which have better solvent resistance than those compounded with vinyl chloride-vinyl acetate copolymers without the ethenoid acid.

Various resins such as the urea-formaldehyde types react with our terpolymer during baking to produce coatings having excellent, water, acid and alkali resistance. Our terpolymers are useful also as the binder in inks and as the adhesive for woods, plastic or the like.

It will be understood that it is intended to cover all changes and modifications of the examples of the invention herein chosen for the purpose of illustration which do not constitute departures from the spirit and scope of the invention.

We claim:

1. In making a terpolymer, the process which comprises forming an aqueous suspension of the monomers vinyl chloride, vinyl acetate, and an ethenoid acid selected from the group consisting of maleic and fumaric acids, an initiator of ethenoid bond polymerization that is soluble in the monomers in an amount sufficient to catalyze the polymerization, a suspending agent, and, as color stabilizer, the combination of a peroxy compound selected from the group consisting of ammonium, sodium and potassium persulfates and perborates and hydrogen peroxide and a water soluble $C_1$–$C_4$ alcohol in the proportion of about 5%–30% of the weight of the water in said aqueous suspension.

2. In making a terpolymer the process which comprises forming an aqueous suspension of the monomers vinyl chloride, vinyl acetate, and an ethenoid acid selected from the group consisting of maleic and fumaric acids, a monomer soluble initiator of ethenoid bond polymerization, a suspending agent, and a color stabilizer comprising the combination of a peroxy compound selected from the group consisting of ammonium, sodium and potassium persulfates and perborates and hydrogen peroxide and methanol, the methanol being in the proportion of about 5%–30% of the weight of water in said aqueous suspension.

3. The process of claim 2, said initiator being in the proportion of about 0.05–2 parts by weight for 100 parts of said monomers.

4. The process of claim 2, said peroxy compound being potassium persulfate in the proportion of about 0.05–2 parts by weight for 100 parts of said monomers.

5. The process of claim 2, the color stabilizing combination being introduced into said suspension in advance of maintaining the suspension at polymerization temperature and the temperature of polymerization being about 70°–160° F.

References Cited by the Examiner

UNITED STATES PATENTS

| | | | |
|---|---|---|---|
| 2,187,817 | 1/1940 | Hopff et al. | 260—78.5 |
| 2,731,449 | 1/1956 | Rowland et al. | 260—78.5 |
| 2,777,836 | 1/1957 | Evenard et al. | 260—78.5 |
| 2,917,494 | 12/1959 | Martin | 260—78.5 |
| 2,941,474 | 6/1960 | Reymann et al. | 260—78.5 |
| 2,966,480 | 12/1960 | Wechsler et al. | 260—78.5 |
| 3,069,400 | 12/1962 | Halpern | 260—80.5 |

JOSEPH L. SCHOFER, *Primary Examiner.*

MORRIS LIEBMAN, DONALD E. CZAJA, LEON J. BERCOVITZ, *Examiners.*